United States Patent
Javelly et al.

(10) Patent No.: US 7,665,577 B2
(45) Date of Patent: Feb. 23, 2010

(54) SYSTEM FOR LUBRICATING AND MONITORING A LUBRICATABLE ELEMENT

(75) Inventors: Christian Javelly, Saumur Cedex (FR); Guy Malbrunot, Saumur Cedex (FR); Jerome Courjault, Saumur Cedex (FR)

(73) Assignees: Willy Vogel AG, Berlin (DE); Vogel Mecafluid S.A., Saumur (FR)

( * ) Notice: Subject to any disclaimer, the term of this patent is extended or adjusted under 35 U.S.C. 154(b) by 528 days.

(21) Appl. No.: 10/416,163

(22) PCT Filed: Oct. 26, 2001

(86) PCT No.: PCT/EP01/12433

§ 371 (c)(1), (2), (4) Date: Nov. 12, 2003

(87) PCT Pub. No.: WO02/40913

PCT Pub. Date: May 23, 2002

(65) Prior Publication Data

US 2004/0065511 A1    Apr. 8, 2004

(30) Foreign Application Priority Data

Nov. 15, 2000 (FR) .................................. 00 14732

(51) Int. Cl.
*F16N 7/16* (2006.01)
*F16N 13/22* (2006.01)
*F01M 9/00* (2006.01)
*F01M 1/18* (2006.01)
*F01M 11/10* (2006.01)

(52) U.S. Cl. ............... 184/15.2; 184/15.1; 184/6.1; 184/6.4

(58) Field of Classification Search ............ 184/6.1, 184/6.4, 6.21, 7.4, 107, 108, 15.1, 15.2, 15.3
See application file for complete search history.

(56) References Cited

U.S. PATENT DOCUMENTS

| | | | | |
|---|---|---|---|---|
| 2,684,733 | A * | 7/1954 | Freiman | 184/15.2 |
| 3,073,415 | A | 1/1963 | Dutton | |
| 4,445,168 | A | 4/1984 | Petryszyn | |
| 4,520,902 | A * | 6/1985 | Snow | 184/7.4 |
| 4,527,661 | A | 7/1985 | Johnstone et al. | |
| 4,537,285 | A * | 8/1985 | Brown et al. | 184/15.2 |
| 4,877,111 | A * | 10/1989 | Kilper | 184/15.1 |
| 5,038,893 | A * | 8/1991 | Willner et al. | 184/7.4 |
| 5,060,760 | A * | 10/1991 | Long et al. | 184/6.4 |
| 5,669,839 | A | 9/1997 | Graf et al. | |
| 7,017,712 | B1 * | 3/2006 | Rake et al. | 184/6.4 |
| 2002/0029933 | A1 * | 3/2002 | Rodemer et al. | 184/15.2 |

FOREIGN PATENT DOCUMENTS

| | | |
|---|---|---|
| DE | 19 84 854 | 5/1968 |
| DE | 44 06 099 | 8/1995 |

(Continued)

*Primary Examiner*—Thomas R Hannon
*Assistant Examiner*—Justin Krause
(74) *Attorney, Agent, or Firm*—Oblon, Spivak, McClelland, Maier & Neustadt, L.L.P.

(57) ABSTRACT

A system for lubricating at least one lubricatable element, the system having an injection head for a lubricant that is adapted to be brought into contact with the at least one lubricatable element and a mechanism for evaluating the state of the element.

14 Claims, 9 Drawing Sheets

FOREIGN PATENT DOCUMENTS

| | | |
|---|---|---|
| EP | 0 811 568 | 12/1997 |
| GB | 2 104 978 | 3/1983 |
| JP | 63-184300 | 7/1988 |
| JP | 08-061592 | 3/1996 |
| JP | 11-180668 | 7/1999 |
| JP | 2000-205491 | 7/2000 |

* cited by examiner

APPLICATION: LUBRICATION OF THE CONVEYOR BELT ONE
AXIS AFTER THE OTHER

CONFIGURATION    RESULTS

| | MINIM. | MAXIM. | MINIM. | MAXIM. | MIDDLE |
|---|---|---|---|---|---|
| Injection (x0,01s) 10 | | 850 | 15 | 250 | 150 |
| Transfer (x0,01s) 30 | | 100 | 37 | 57 | 50 |
| Gradient (bar/s) 50 | | 900 | 100 | 201 | 144 |
| Cradle (x0,01s) 10 | | 100 | 40 | 45 | 43 |
| Injection (bar) 98 | | 105 | 100 | 104 | 101 |
| Expansion (bar) 1 | | 9 | 4 | 4 | 4 |
| Refill (bar) -20 | | 30 | 18 | 19 | 18 |

SYSTEM FOR LUBRICATING AND MONITORING A LUBRICATABLE ELEMENT

The present invention is related to the field of the prospective maintenance of elements that may be subjected to wear and tear.

The present invention also pertains to the field of the lubrication of such type elements. The elements may be part of a conveyor apparatus and for example be of the kind of an escalator or of the kind used to transport objects into a factory or a warehouse such as for example a conveying apparatus of a line for sterilizing tinned food in a food plant.

The devices for lubricating during operation generally comprise a lubricant dispenser that is brought into contact with the element to be lubricated while said element is moving, synchronization being ensured by the fact that the device is driven by the element to be lubricated. In this respect, the French document No. 2 749 571 is known, which more specifically finds application in escalators or moving sidewalks in which it ensures reliable lubrication.

This document describes an automatic lubricating device with a plurality of pumps that are driven along a path and are provided with a carrying element that carries a part which can be moved in translation relative to the carrying element and can be brought into contact with a lubricating fitting of a movable element for allowing injection of a lubricant therein during a lubrication phase. The pumps are connected through an endless connecting means. The lubricating device is driven through the lubricating fittings acting onto the movable parts of the pumps. During the lubricating phase, the movable part of a pump is coaxial with the corresponding lubricating fitting as soon as the movable part and the lubricating fitting are brought into contact. The lubricating device is comprised of a means for keeping the carrying element of a pump in a stationary relationship with the corresponding lubricating fitting and the movable part is displaced normal to the path of the lubricating fitting.

A lubricating system with only one single reciprocating pump also exists.

In the field of food products, a multitude of conveyor belts are being used which comprise articulated members, axes and mostly rollers for rolling on a roller conveyor belt. It has been found necessary to lubricate the joints between the members and the bearings of the rollers in order to lengthen the life of the conveyor belt. Traditionally, this lubrication is performed by hand by an operator, which proved to be expensive with respect to the time the operator needs to perform this task and to the time the conveyor belt must be halted, which generally requires further machines located up- and downstream of the conveyor belt to be stopped. Moreover, the operator may forget to lubricate one of the elements of the conveyor belt or may inject an insufficient or an excess quantity of lubricant, which in the first case may cause excessive wear of the belt and in the second case the lubricant to flow out, which is disastrous with regard to the strict hygiene regulations the equipment of the food industry is required to comply with.

Moreover, the operating conditions are sometimes stringent because of the increased operating temperature, the temperature variations between the periods of operation and the idle periods, generally during the night, and because of the high humidity, more specifically in the case of a belt installed on a sterilization machine for tinned food. Therefore, insufficient lubrication involves the risk that the belt wears rapidly which would lead to an increase in the energy losses and to excess consumption by the electric driving motor(s), that a lengthening of the chain happens and, as a result thereof, that the spacing between two elements increase which, in certain applications, is found disturbing, more specifically if an object to be transported is hung on swings that are fixed to the belt, for example in a factory for manufacturing vehicles, and finally that the tearing of the chain occurs which would result in the conveyor apparatus having to be brought to a halt and the surrounding machines to be stopped.

The invention suggests to eliminate the disadvantages of the prior art systems.

The invention suggests to perform, at time settable intervals, an evaluation of the state of a conveying element without the conveyor apparatus having to be halted.

The invention suggests to provide a monitoring function in addition to the lubricating function.

According to one aspect of the invention, the lubricating system is intended for at least one lubricatable element. The system is comprised of a lubricant-injection head that is suited to be brought into contact with the element at least at regular intervals. The system is comprised of a means for evaluating the state of the element.

The injection head can be adapted to be brought into contact at least at regular intervals.

The element can be an axis that connects two chain links of a conveyor apparatus or a roller element of a conveyor apparatus.

Advantageously, the element is comprised of a receiving member adapted to cooperate with the injection head and of an active part to be lubricated and the system is comprised of a means for evaluating the state of the active part. The receiving member discharges in the active part.

In an embodiment of the invention the evaluation means comprises a sensor for sensing the lubricant pressure. The sensor may be a piezoelectric sensor that delivers an analog voltage or current signal at the output.

In an embodiment of the invention, the sensor is disposed upstream of the injection head as viewed in the direction of flow of the lubricant.

The sensor is preferably disposed in a dosing chamber.

In an embodiment of the invention, the system comprises means for storing the data delivered by the evaluation means. It is thus possible to determine the evolution of the state of the element. In the case of a conveyor apparatus comprised of a plurality of elements of one single type or of sometimes two or three different types, the individual state of each element is stored so that maintenance work required for this element can be provided. Advantageously, at least one element is marked so that the system recognizes each element contacting the lubricating system during passage thereof.

Advantageously, the system comprises an acquisition card and a computer. The acquisition card forms an interface between the evaluation means and the computer.

In an embodiment of the invention the computer comprises computing means adapted to deliver a pressure curve as a function of time, means for comparing the curve with predetermined values and warning means in the event that one of the values has been reached. The pressure curve as a function of time may be recorded for each lubricating cycle of every element or at longer time intervals, such as once a day for each element for example. A lubricating cycle comprises a phase of preparation in which the injection head is brought nearer, a phase of actual injection during which the pressure curve as a function of time is recorded, and a phase of removal during which the pressure drop can be measured.

In an embodiment of the invention the values include the maximum pressure, the minimum pressure and the maximum pressure increase.

The present invention also suggests a system for monitoring the state of an active part of an element, said element comprising a means for lubricating said element and a means for evaluating the state of said element. The evaluation means can be attached to the lubrication means.

Advantageously, the element belongs to a conveyor belt which is comprised of a plurality of identical elements.

The invention also suggests a method for monitoring the state of an active part of an element by which a lubricant is injected into the element and the state of the element is evaluated.

More specifically, the state of an axis to be lubricated is monitored, lubricant is injected into a space that is in contact with the axis and is provided for this purpose, and a variable representing the state of the axis is measured during injection. The variable may be the injection pressure of the lubricant. It is for example a matter of course that if the lubrication port is clogged, the pressure will adopt excessively high values. Conversely, if the axis shows considerable wear performance with a certain amount of play relative to the elements which it connects, the lubricant will be capable of flowing more easily and the pressure of the lubricant during injection will be extremely low.

The present invention will be understood better upon reading the non restrictive detailed description of an embodiment, given by way of example only, with reference to the appended drawings wherein.

Figure 1:
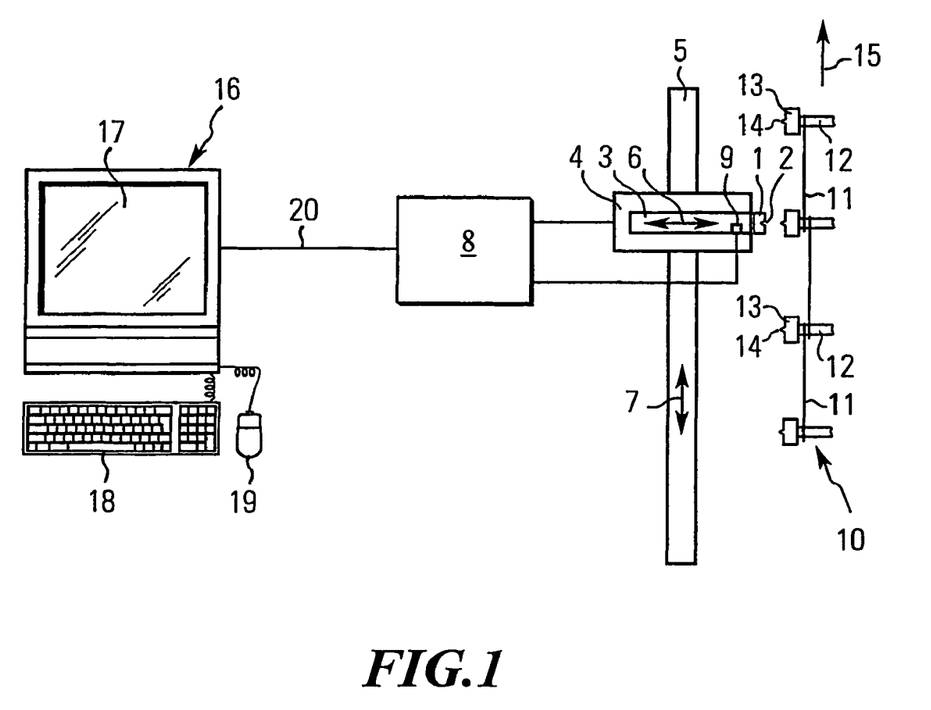
FIG. 1 is a schematic view of the system according to an exemplary embodiment of the invention.

From FIG. 1 it can be seen that the system comprises an injection head 1 which is provided with a cavity 2 appropriate to cooperate with a lubricating fitting, a lubricating pump 3, preferably configured to be a dosing pump, which is adapted to pump a given dosing amount of lubricant upon each actuation, a pump-carrying cradle 4 and a rail 5 intended to be mounted in a fixed position.

The pump 3 can be moved in translation relative to the cradle 4 in the direction as shown by the arrow 6. For this purpose, an electrical or pneumatic actuation member may be provided but has not been illustrated herein for purposes of clarity. The cradle 4 is movable relative to the rail 5 in the direction as shown by the arrow 7. The motion of translation of the cradle 4 relative to the rail 5 may either be ensured by an actuation member (not shown) or by a device for temporarily blocking the motion of the cradle 4 on a conveyor apparatus. Such a blocking means may be comprised of a movable pin which in one position engages in a space through which an element of the conveyor apparatus extends during the displacement thereof. When the pointer is moved backward, the cradle 4 is allowed to return to its initial position by the action of gravity and/or of a spring system and/or a counterweight and/or a pneumatic or electrical actuation member.

The system further comprises an control unit 8 intended to perform the function of controlling the actuation member of the pump 3 and the movement of the cradle 4. The pump 3 is equipped with a pressure sensor 9 that is also connected to the control unit 8. The pressure sensor 9 can for example be an analog or a piezoresistive sensor and can supply an output current that is proportional to the measured pressure.

The conveyor apparatus with which the system is to cooperate is indicated at 10 and has been represented in parts only. The conveyor apparatus 10 comprises a plurality of connecting elements 11 that are generally oriented in the direction of their displacement, a plurality of axes 12 that are generally oriented in the direction transverse to their displacement and join the connecting elements 11 together, and a plurality of rollers 13 that are mounted on the end portion of the axes 12 in order to allow the conveyor apparatus 10 to be carried by a stationary roller belt (not shown). In order to ensure lubrication of the elements of the conveyor apparatus 10 that are displaced relative to each other, more specifically on the end portions of the conveyor apparatus as viewed in the longitudinal direction, the end portion of each axis 12 is connected to a lubricating fitting 14 that extends beyond the corresponding roller 13 and is configured as a protuberance capable to cooperate with the cavity 2 of the injection head 1. The element corresponding to the lubricating fitting could also be hollow and capable to cooperate with an injection head provided with a protuberance.

In the shown example, the part of the conveyor apparatus 10 that is located adjacent the system is displaced in the direction of arrow 15, the return of the conveyor apparatus is not shown. For the purpose of lubricant transfer between the pump 3 and the lubricating fitting 14 in this phase, the injection pump 3 is capable of coming into contact with the lubricating fitting 14 as the conveyor apparatus 10 is being moved, and then parting from the lubricating fining 14 to move back in the direction opposite arrow 15 and to come into contact with another lubricating fitting 14 that may be the following lubricating fitting or a lubricating fitting located farther away. These steps are controlled by the control unit 8.

The system further comprises a computer 16 provided with a monitor 17, a keyboard 18 and a mouse 19 and, not shown, with at least one processor, a read-only memory, a working memory and a bus for communication between said elements. A data transmission connection 20, which can be an ADC-type or an RS 232-type, serves as an interface between the control unit 8 and the computer 16. The computer 16 has a program which is stored in the read-only memory and is capable of processing data originating from the control unit 8 which regard on the one hand the pressure data delivered by the sensor 9 and on the other hand the control and verifying data originating from the control unit 8 itself.

Figure 2:
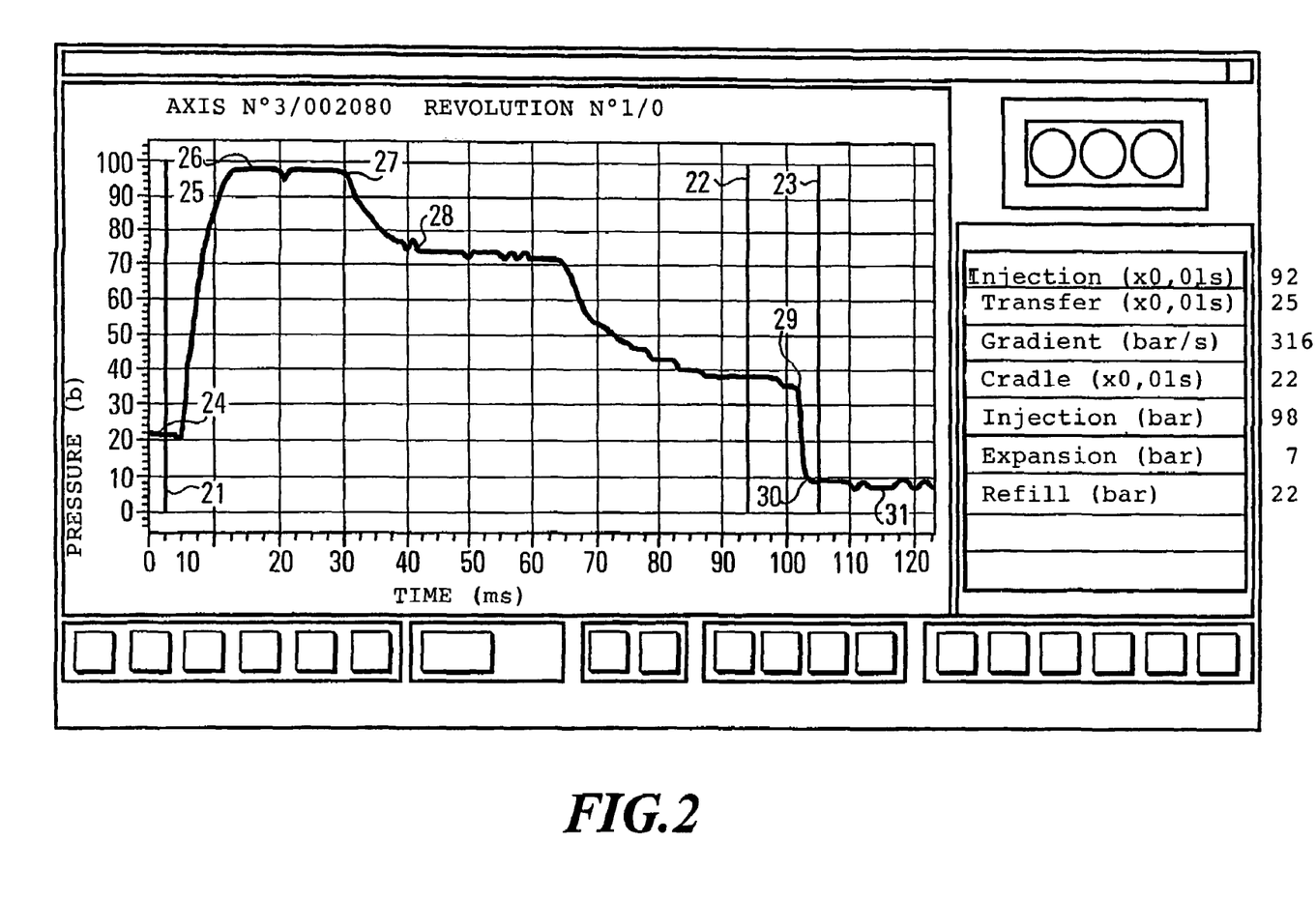
FIGS. 2 to 4 show examples of pressure curves as a function of time during a lubrication cycle.
Figure 3:
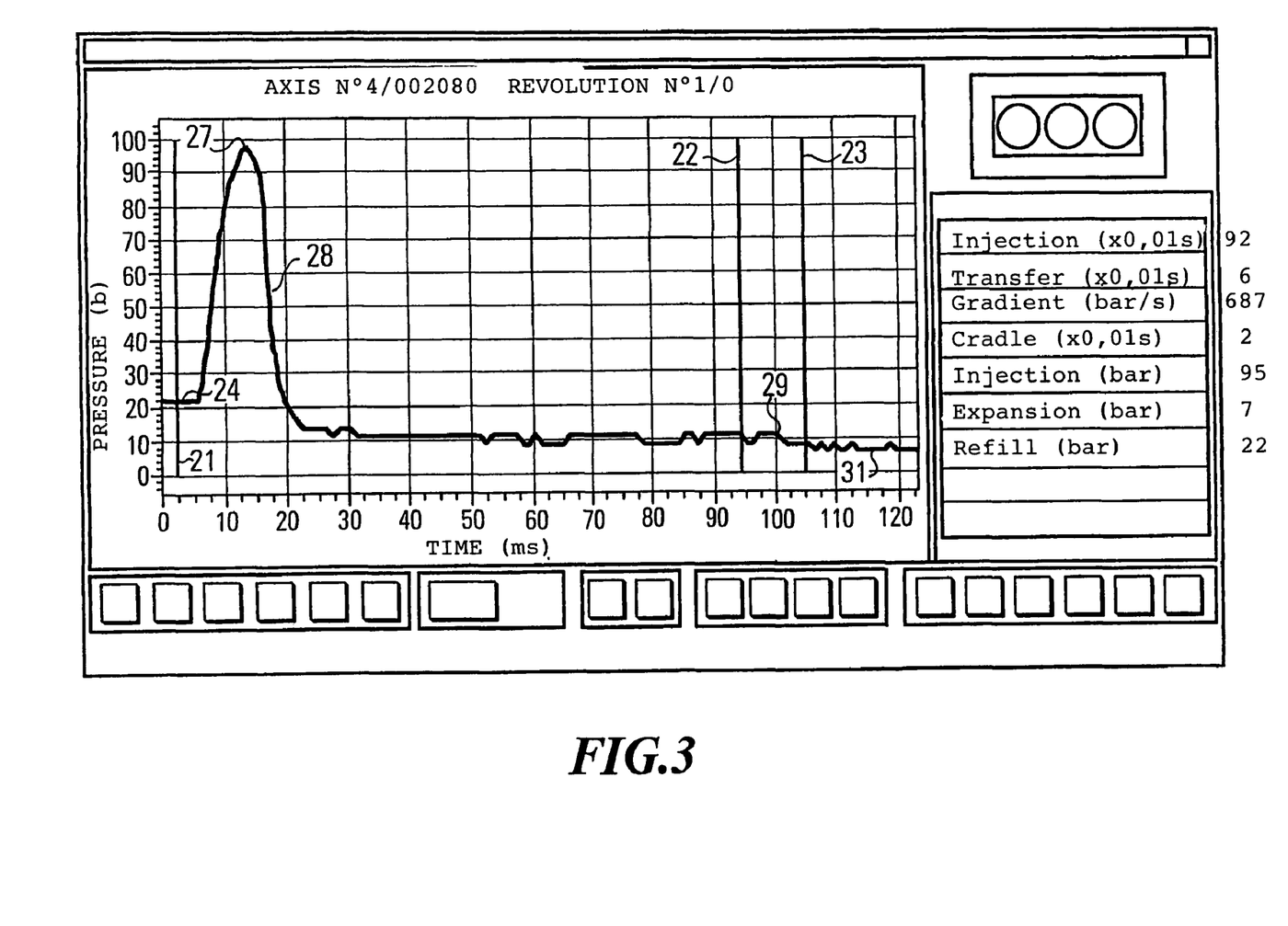
Figure 4:
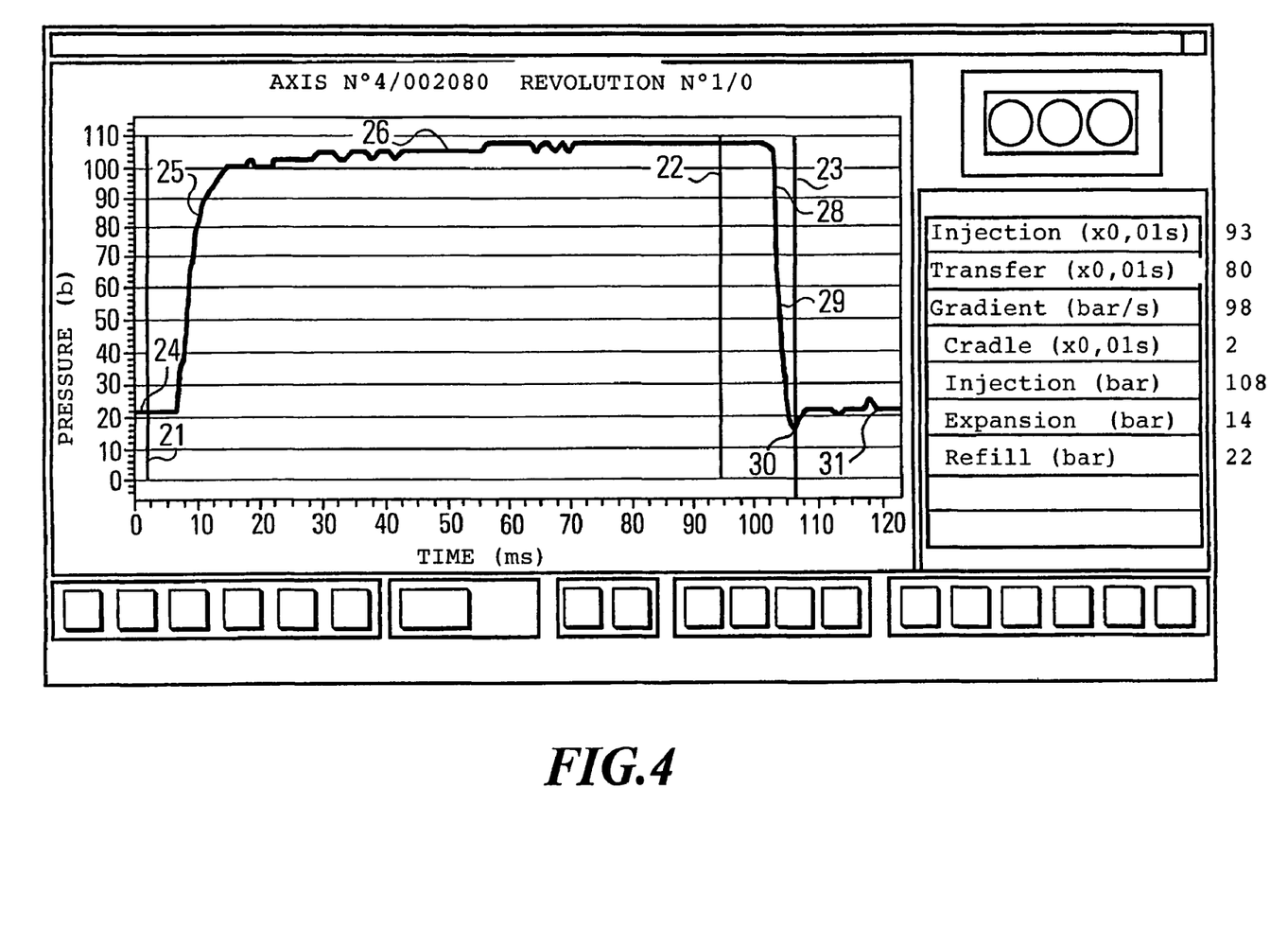

From the FIGS. 2 through 4 it can be seen that the programme permits to analyze and interpret the pressure data as a function of time.

FIG. 2 shows a window intended to be displayed on the monitor 17 of the computer 16. The window displays a curve that shows the time in milliseconds on the abscissa and the pressure in bar on the ordinate. The time 0 is delivered by the control unit 8 at contact between the conveyor apparatus 10 and the injection head 2. The vertical bar 21 corresponds to a signal sent by the control unit 8 for the start of the displacement of the cradle 4. The vertical bar 22 corresponds to the time of the return motion of pump 3, said return motion being controlled by the control unit 8. The vertical bar 23 corresponds to the return motion of the blocking pin that permits to synchronize the motion of the cradle 4 and the motion of the conveyor apparatus 10.

The pressure curve as a function of time consists of a plurality of phases:

phase 24—constant pressure that begins at time t=0 and extends beyond the vertical bar 21. The cradle 4 moves synchronous to the conveyor apparatus 10. The injection head 2 gets near the corresponding lubricating fitting 14.

phase 25—fast increase in pressure that corresponds to the beginning of the lubricant transfer from the pump 3 to the conveyor apparatus 10.

phase 26—substantially constant, increased pressure for a period of time that is here slightly shorter than 20 ms.

phase 27—too short to be suitably shown in FIG. 2, it generally corresponds to a peak at the end of phase 26.

phase 28—pressure drop, in the present case of bearings, which corresponds to the end of the lubricant transfer, the pre-defined volume having already been transferred during the previous phases.

phase 29—corresponding to the time after vertical bar 22 and after refilling the dose of the dosing pump 3, therefore pressure drop until a value is reached that is smaller than that of phase 24, until reaching phase 30 that constitutes the lowest pressure value followed by phase 31 of stability and of slight increase in pressure.

Moreover the information for the identification of the axis the lubrication curve of which is displayed appears on the top left corner of the screen above the window. The current axis is axis No. 3 of a conveyor apparatus with 2080 axes. The number of revolutions of the conveyor apparatus from the beginning of the measurement is also displayed. In the example shown, it is the first revolution. On the right side of the window a colour code is displayed depending on whether the state of the axis the curve of which is displayed is satisfactory, non-satisfactory or to be monitored particularly. To the right of the window, there are displayed the injection time, which is confined between the bars 21 and 22, and the transfer time, which is defined as the time during which the pressure is greater than a predetermined percentage, e.g., 90% of the maximum pressure observed during the phases 26 and 27. The gradient given in bar/second is derived from the curve in phase 25.

The term "cradle" designates the time the cradle 4 needs to return to its initial position so that it is ready for the next injection of lubricant. The term "injection" is the maximum injection pressure on the displayed curve. The term "expansion" is the minimum pressure measured on the curve, generally during phase 30. The term "refill" is the pressure during phase 24, in other words the refill pressure of the dosing pump 3.

The minimum and maximum values of these various features are defined in order to reliably find a curve showing an anomaly. As a matter of fact, a lubricating fitting clogged with dust or foreign matter may possibly have a curve showing values of transfer time, gradient, injection pressure and expansion pressure that are too high as the dosing device remains filled with lubricant. A missing lubricating fitting, or even a missing axis, will be expressed by a too low gradient, a too low injection pressure, and a too low transfer time as well. If the lubricant reservoir connected with the dosing pump 3 is empty, the expansion pressure will be too low because in this case nothing but air is admitted into the dosing pump 3. The refill pressure will possibly be low as well.

FIG. 3 shows a window similar to that shown in FIG. 2 except the fact that the curve represents the case in which a lubricating fitting is missing. It can be seen that the lubricating fitting of concern is that of axis No. 7. Here, the transfer time is much shorter. Conversely, FIG. 4 shows the case in which a lubricating fitting is clogged. Then, the transfer time is too long and the injection pressure too high.

Figure 5:
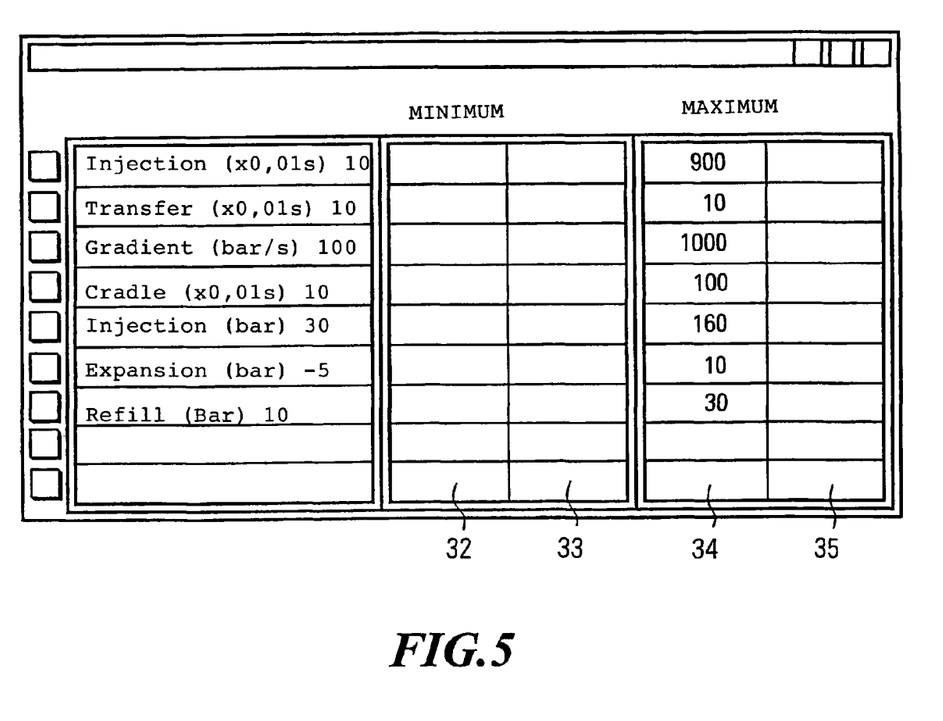
FIG. 5 is a view of a window for configuring the parameters of the evaluation.

FIG. 5 shows a window that is capable to be displayed on the monitor 17 of computer 16 and that permits to adjust the minimum and maximum values of the injection time, the transfer time, the gradient, the time needed for the cradle to return, the injection pressure, the expansion pressure and the refill pressure. The minimum values established by the operator or the supplier of the system appear in column 32 whereas the corresponding maximum values appear in column 34. The minimum values measured for a given conveyor apparatus appear in column 33 and the maximum values measured in column 35.

Figure 6:
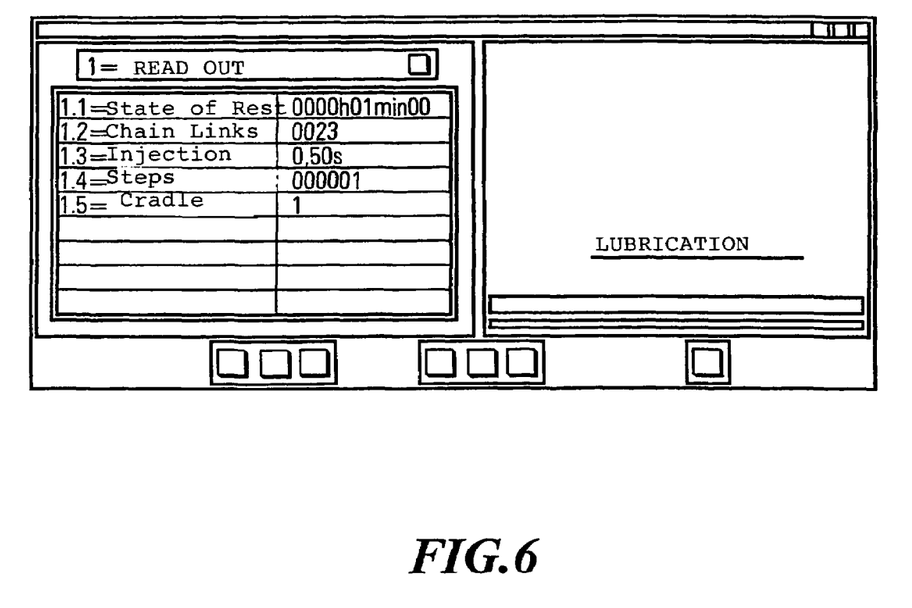
FIG. 6 is a view of a window for configuring the parameters of the conveyor apparatus.

FIG. 6 shows a window that permits to enter data about the conveyor apparatus such as for example the resting time between two lubricating sequences, the number of members, the injection time, the increment P, meaning that lubrication is performed on every $p^{th}$ lubricating fitting only, which has been found out to be particularly useful in the case of fast moving conveyor apparatuses in which it is more convenient to lubricate every $p^{th}$ lubricating fitting only and to have it make P revolutions before a complete lubrication. Further, the number of cradles or carriers as well as other parameters that have not been discussed herein also appear.

Figure 7:
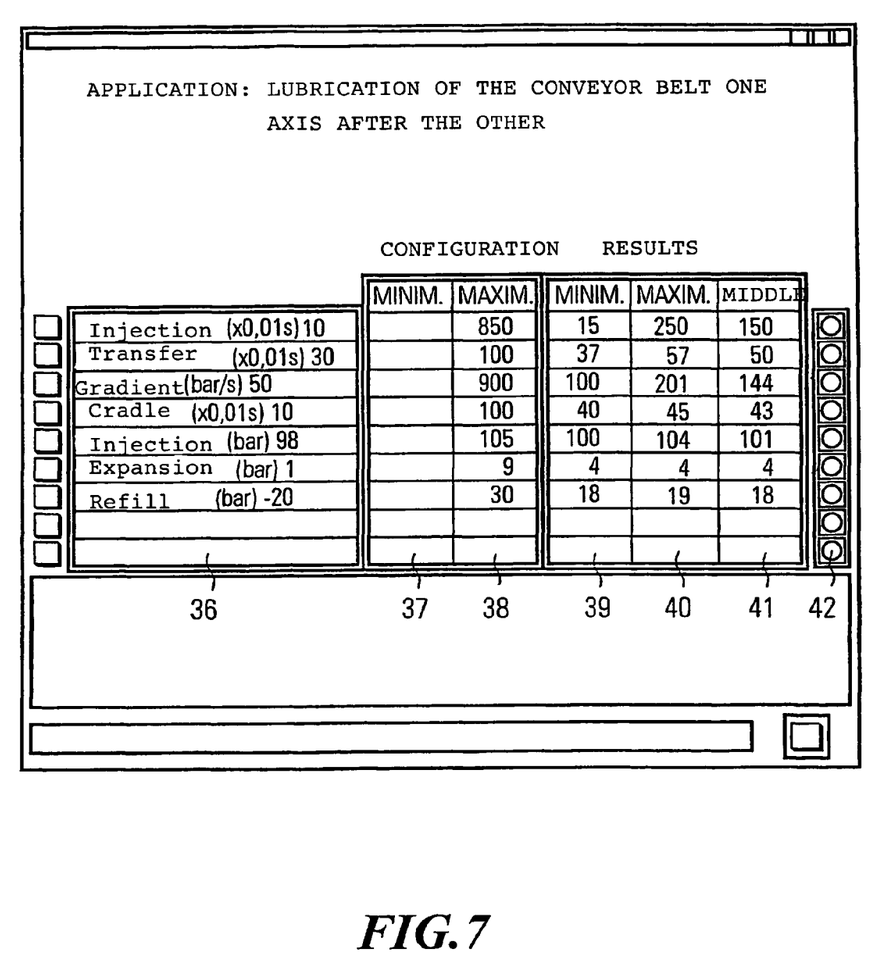
FIG. 7 is a view of a window with a summary of the evaluations performed for all of the elements of a conveyor apparatus.

FIG. 7 shows a window intended to be displayed on the monitor 17 of computer 16 for showing the summary of the results of measurement. The seven features mentioned herein above are displayed in column 36. The predetermined minimum values appear in column 37. The predetermined maximum values appear in column 38. The minimum values measured appear in column 39, the maximum values measured in column 40 and the mean values measured in column 41. A warning indicator appears in column 42, the color of which is green as long as the value is satisfactory, orange if the result indicates that monitoring is required, and red if the results are non-satisfactory.

Figure 8:
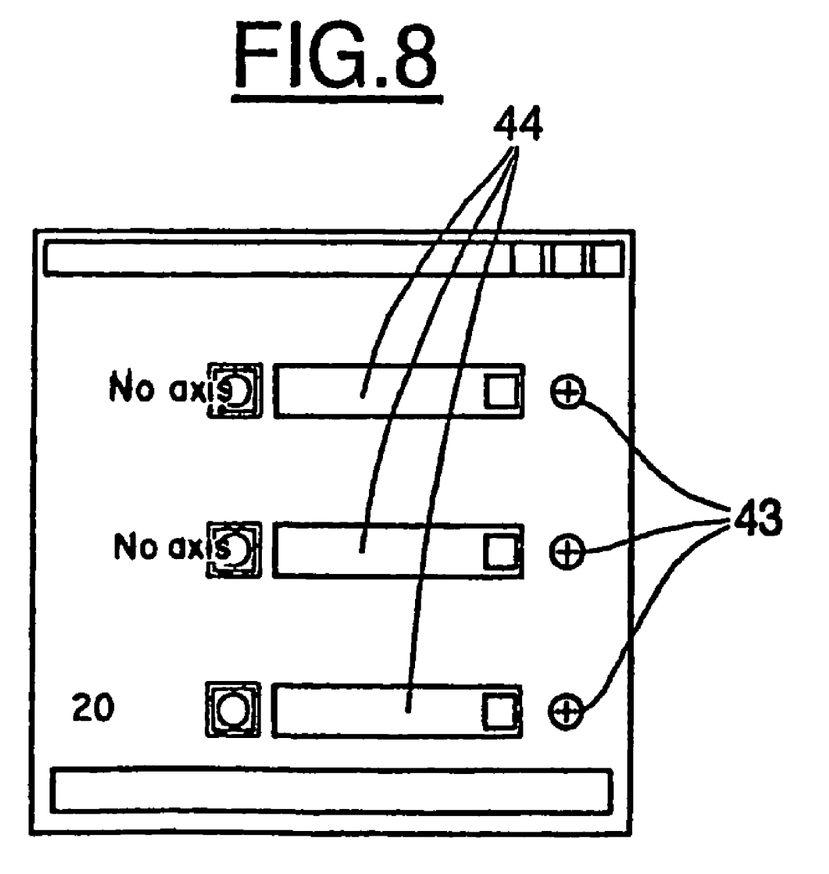
FIG. 8 is a view of a window with a summary in which the elements are classified according to their state.

FIG. 8 illustrates a window with smaller dimensions that is easier to display on part of the monitor 17 and that summarizes the information displayed in the window of FIG. 7. According to the colors explained herein above, the axes are divided into three categories: satisfactory, to be monitored, non-satisfactory. In the case represented, no axis belongs to the non-satisfactory or to the to-be-monitored category and the twenty axes that have been analyzed belong to the satisfying category. If one directs the pointer of the mouse onto arrow 43, a list of the axes in each category is displayed, and in displacing the pointer onto region 44 in which the number of the axis is shown, it is possible to initiate the visual display of detailed data about the axis, for example in the way shown in the FIGS. 2 through 4.

Advantageously, the computer 16 is connected to an Internet-type communication network that permits teletransmission of the data corresponding to the windows discussed herein above. Remote monitoring of a conveyor apparatus may thus be achieved and, in the event that parts need to be replaced, an operator may be sent with the faultless parts or a local maintenance service may be informed that such and such a part of such and such an axis of the conveyor apparatus needs to be replaced soon.

With remote monitoring, a remote operator receives all the data referring to the conveyor apparatus, analyzes the data by searching the faults of the elements that are indicated as being in a non-satisfactory state or in a state that needs monitoring and can send to a local maintenance service a summary establishing the number of the element, the kind of the variable which is different from normal and the most likely fault as well as a suggestion for eliminating the fault.

The lubrication cycle can be optically displayed in real time, the course of the lubrication cycles of each element to be lubricated can be analyzed and an information about the state thereof can be inferred therefrom.

The control unit 8 can be readily programmed to perform lubrication at regular intervals. The computer processes the measuring data during the lubrication cycle of the elements of the conveyor apparatus and can output a warning message if a non-satisfactory result is obtained for one of the elements. The warning message can be displayed on the monitor 17 or on a remote monitor and can be combined with an alarm sound.

The system may moreover be completed by a temperature sensor that may be disposed in proximity to the interior space of the dosing pump 3 for sensing the temperature of the lubricant and/or in proximity to the elements of the conveyor apparatus that are to be lubricated, for example by means of an infrared sensor located at a certain distance, for the purpose of for example shortening the lubrication cycles if operation takes place at a higher temperature which results in a satisfactory lubrication or conversely to lengthen the cycles if operation takes place at a low temperature, which results in lubricant savings.

The system may also be connected to the control system of an electric drive motor of the conveyor apparatus, which control system may consist of a computer, an control unit or a monitoring device, so that an information about the power consumed by the electric drive motor is transmitted to the computer 16 which is capable of initiating a premature lubrication cycle if the power consumption increases to exceed a predetermined value.

Figure 9:
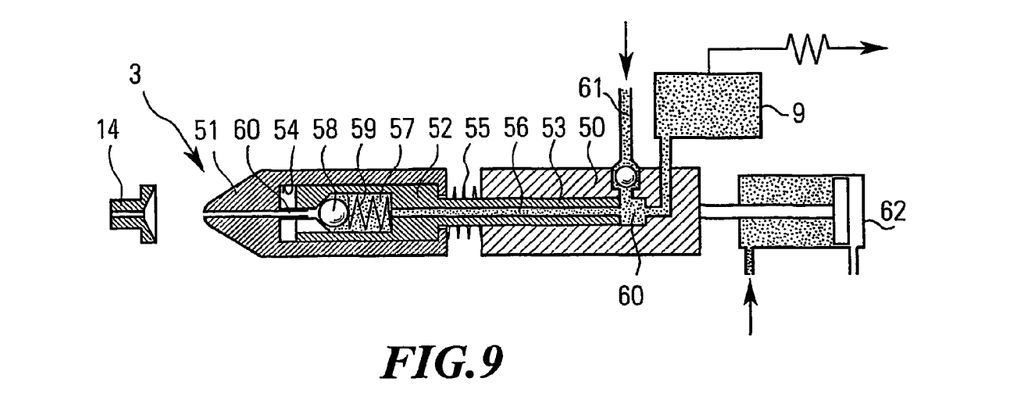
FIG. 9 is a partial sectional view of an example of a dosing pump that may be provided with a pressure sensor and, if necessary, with a temperature sensor mounted thereon.
Figure 10:
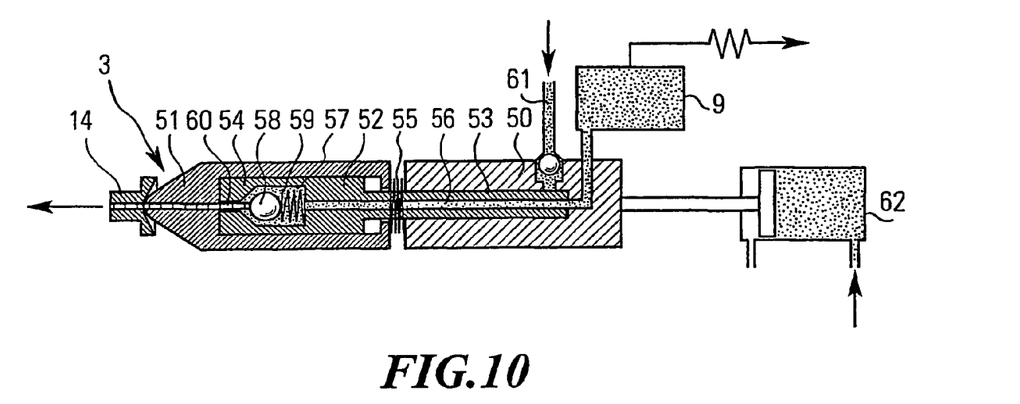
FIG. 10 is a view similar to FIG. 9 showing the dosing pump in operation.

From the FIGS. 9 and 10 in particular it can be seen that a pump 3 comprises a carrying element 50, a contact piece 51 that forms a cylinder capable to move in translation relative to the carrying element 50 in a direction perpendicular to the movement of said carrying element 50, and a piston 52 capable to be moved in translation relative to the contact piece 51 which is capable of coming into contact with a lubricating fitting 14. At one end, the piston 52 engages a bore 53 of the carrying element 50 and at the other end a bore of the contact piece 51. A dosing chamber 63 is formed between the piston 52 and the closed end of bore 53.

A spring 55 is disposed around the piston 52 between the carrying element 50 and the contact piece 51. The piston 52 is provided with a hole that is oriented in the longitudinal direction and forms a channel 56 for the lubricant. The channel 56 comprises a widening or chamber 57 which is located on the side of the contact piece 51 and accommodates a sealing ball 58 and a spring 59, the two of them forming a valve that is closed in the position of rest (FIG. 9) and open for lubrication in the active position (FIG. 10). Therefore, the lubricant within the chamber 57 has no contact with the ambient air in the position of rest so that it is prevented from decomposing.

The contact piece 51 comprises a tube 60 disposed in the bore 54, said tube being adapted to come into contact with the ball 58 for displacing it relative to the piston 52, which enables the lubricant to flow to the lubricating fitting 14. The bore 53 of the carrying element 50 is connected with a lubricant supply line 61 in order to allow filling of the dosing chamber 63 in the position of rest. The carrying element 50 is connected to an actuation member 62, for example to a hydraulic or pneumatic cylinder, that is capable of displacing it in translation. A pressure sensor 9 is intended to measure the pressure in the dosing chamber 63.

In the position of rest (FIG. 9), the springs 55 and 59 are unloaded. The carrying element 50 and the contact piece 51 are spaced apart and the contact piece 51 is spaced apart from the lubricating fitting 14. The ball 58 is in the locking position.

In the active position of lubrication (FIG. 10), the actuation member 62 displaces the carrying element 50, the piston 52 and the contact piece 51 toward the lubricating fitting 14. The contact piece 51 is stopped by the lubricating fitting 14. The carrying element 50 continues to move and gets near the contact piece 51 while compressing the spring 55. The ball 58 contacts the tube 60 that blocks its movement while compressing the spring 59. The lubricant may then flow out.

Accordingly, the system permits to confirm that the lubrication is satisfactory, to acquire the parameters of the lubrication cycle and to check the lubrication cycle, to provide information for every chain link or every element of a conveyor belt, to select the lubricant in the best possible way insofar as it is easy to perform a lubrication cycle with another lubricant than the usual one and to analyze the pressure curves as a function of time for each lubrication cycle, to program and comply with the changes in the parameter adjustments of the control unit, to record and file the injection curves of each chain link for analysis. The analysis of the injection curves permits to register poor lubrication or a fault of the element (the chain link can be open, broken, clogged, and so on).

Accordingly, the system permits efficient, prospective maintenance with every element of the conveyor apparatus being monitored, which results in a longer life of the conveyor apparatus and in savings of lubricant. The longer life of the conveyor apparatus is an important advantage with respect to the costs involved in replacement and in downtime of production during replacement of the conveyor apparatus.

Furthermore, the control unit may be provided with a memory large enough to hold the pressure data measured by the pressure sensor and to permit that an operator in charge of maintenance appears at regular but spaced intervals with a portable computer to temporarily connect it to the control unit in order to transfer and analyze the data.

The invention claimed is:

1. A method for lubricating and monitoring a state of a lubricatable element during a lubrication cycle in which an injection head injects lubricant into the lubricatable element, comprising:

measuring an injection pressure of lubricant being injected into the lubricatable element as a function of time during the lubrication cycle;

registering the injection pressure as a variable representing the state of the lubricatable element during the lubrication cycle; and     evaluating the state of the lubricatable element as a function of the variable,     wherein the injection pressure is measured upstream of the injection head as viewed in the direction of flow of the lubricant, and the state of the lubricatable element is evaluated during injection of the lubricant by an analysis of the injection pressure as a function of time, the analysis including an interpretation of a transfer time, the transfer time defined as a time during which the pressure is greater than a predetermined percentage of a maximum pressure observed during the injection cycle.

2. The method as defined in claim 1, further comprising, for lubrication:

bringing the injection head in contact with the lubricatable element;

injecting the lubricant;

detaching and the injection head from the lubricatable element.

3. The method as defined in claim 1, further comprising storing an individual state of a plurality of lubricatable elements.

4. The method as defined in claim 1, wherein the lubrication cycle is shortened or lengthened depending on a temperature of the lubricant.

5. The method as defined in claim 1, wherein a dosing pump with the injection head is moved together with the lubricatable element in a translation direction.

6. The method as defined in claim 5, wherein a cradle carrying the dosing pump and the injection head is locked with the lubricatable element during movement of the lubricatable element.

7. The method as defined in claim 1, wherein the lubricatable element is lubricated while being moved.

8. The method as defined in claim 1, wherein the injection head is successively brought into contact with a plurality of moving lubricatable elements that are moved by a conveyor element.

9. The method as defined in claim 8, wherein a state of the conveyor element is evaluated at adjustable time intervals during operation of the conveyor element.

10. The method as defined in claim 1, wherein the lubrication cycle is shortened if a temperature of the lubricant is increased.

11. A method for lubricating and monitoring a state of a lubricatable element during a lubrication cycle in which an injection head injects lubricant into the lubricatable element, comprising:
    measuring an injection pressure of lubricant being injected into the lubricatable element as a function of time during the lubrication cycle;
    registering the injection pressure as a variable representing the state of the lubricatable element during the lubrication cycle; and
    evaluating the state of the lubricatable element as a function of the variable, wherein the injection pressure is measured upstream of the injection head as viewed in the direction of flow of the lubricant, and the state of the lubricatable element is evaluated during injection of the lubricant by an analysis of the injection pressure as a function of time, the analysis including an interpretation of a pressure increase in the beginning of the lubricant transfer.

12. The method as defined in claim 11, wherein the pressure increase is compared with predetermined minimum and maximum values.

13. A method for lubricating and monitoring a state of a lubricatable element during a lubrication cycle in which an injection head injects lubricant into the lubricatable element, comprising:
    measuring an injection pressure of lubricant being injected into the lubricatable element as a function of time during the lubrication cycle;
    registering the injection pressure as a variable representing the state of the lubricatable element during the lubrication cycle; and
    evaluating the state of the lubricatable element as a function of the variable, wherein the injection pressure is measured upstream of the injection head as viewed in the direction of flow of the lubricant, and the state of the lubricatable element is evaluated during injection of the lubricant by an analysis of the injection pressure as a function of time, the analysis including an interpretation of a transfer time, the transfer time defined as a time during which the pressure is substantially equal to constant maximum pressure observed during the injection cycle.

14. A method for lubricating and monitoring a state of a lubricatable element during a lubrication cycle in which an injection head injects lubricant into the lubricatable element, comprising:
    measuring an injection pressure of lubricant being injected into the lubricatable element as a function of time during the lubrication cycle;
    registering the injection pressure as a variable representing the state of the lubricatable element during the lubrication cycle; and
    evaluating the state of the lubricatable element as a function of the variable, wherein the injection pressure is measured upstream of the injection head as viewed in the direction of flow of the lubricant, and the state of the lubricatable element is evaluated during injection of the lubricant by an analysis of the injection pressure as a function of time, the analysis including an interpretation of a transfer time, the transfer time defined as a time during which the pressure is greater than a predetermined percentage of 90% of a maximum pressure observed during the injection cycle.

\* \* \* \* \*